(12) United States Patent
Robinson et al.

(10) Patent No.: US 8,736,930 B2
(45) Date of Patent: May 27, 2014

(54) ENABLING OPTIMAL USE OF NON-STANDARD COLORANTS

(75) Inventors: David C. Robinson, Penfield, NY (US); Mustapha Guesmia, West Henrietta, NY (US); Guo-Yau Lin, Fairport, NY (US); Connie F. Purdum, Fairport, NY (US); James M. Sanchez, Rochester, NY (US); Adam E. Stein, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 162 days.

(21) Appl. No.: 13/540,739

(22) Filed: Jul. 3, 2012

(65) Prior Publication Data

US 2014/0009769 A1    Jan. 9, 2014

(51) Int. Cl.
*H04N 1/50* (2006.01)
*H04N 1/60* (2006.01)

(52) U.S. Cl.
USPC .......................................... 358/518; 358/530

(58) Field of Classification Search
CPC ........................... H04N 1/6002; H04N 1/6008
See application file for complete search history.

(56) References Cited

U.S. PATENT DOCUMENTS

| | | | |
|---|---|---|---|
| 5,892,891 A | 4/1999 | Dalal et al. | |
| 6,032,004 A | 2/2000 | Mirabella, Jr. | |
| 6,038,373 A * | 3/2000 | Matsumoto et al. | 358/1.9 |
| 6,698,860 B2 * | 3/2004 | Berns et al. | 358/518 |
| 7,164,498 B2 | 1/2007 | Van Bael | |
| 7,305,200 B2 | 12/2007 | Hoffman et al. | |
| 7,515,300 B2 * | 4/2009 | Takahashi et al. | 358/1.9 |
| 7,990,592 B2 | 8/2011 | Mestha et al. | |
| 2008/0273794 A1 | 11/2008 | Samworth | |
| 2008/0291479 A1 | 11/2008 | Mestha et al. | |
| 2011/0032573 A1 | 2/2011 | Dalal et al. | |

* cited by examiner

*Primary Examiner* — Scott A Rogers
(74) *Attorney, Agent, or Firm* — Gibb & Riley, LLC

(57) ABSTRACT

Methods and systems receive a print job and determine whether the print job specifies one or more extended gamut color marking materials. The extended gamut color marking materials comprise marking materials having colorants other than standard colorants. The standard colorants consist of cyan, magenta, yellow, black (CMYK). When the print job does not specify one or more of the extended gamut color marking materials, the methods and systems determine whether the print job will perform better with one or more of the extended gamut colorants in addition to the standard colorants. The methods and systems print the print job use the extended gamut colorant(s) and the standard colorants when the print job specifies the extended gamut color marking material, and when the print job will perform better with one or more of the print system's extended gamut colorants in addition to the standard colorants.

20 Claims, 4 Drawing Sheets

ENABLING OPTIMAL USE OF NON-STANDARD COLORANTS

BACKGROUND

Embodiments herein generally relate to printing in colorants beyond the standard cyan, magenta, yellow, black (CMYK) and to systems and methods that automate when the more expensive non-standard colorants should be used.

Non-standard colorants are those other than cyan, magenta, yellow, black (CMYK) and are sometimes referred to as extended gamut colorants. For extended gamut N (beyond CMYK) color printing devices, customers want to pay for the more expensive extended gamut colorants only when there is an image quality benefit. Currently users manually select either the output CMYK mode or the CMYK plus extended gamut mode(s) based on knowledge of the job color content.

The extended gamut image quality advantages occur when objects are defined to be printed with the extended gamut colorants and when there are spot color objects that need the extended gamut to achieve an exact (or closer) colorimetric match as compared to standard CMYK printing.

For the common source color spaces such as CMYK specifications web offset publications (SWOP), the image quality benefit of extended gamut colorants is minimal (e.g., just a small portion of an image's input gamut intercepts with the extended print gamut colorants). The image quality can also suffer (e.g., contours, graininess, etc.) when the input color spaces are printed with an extended gamut.

SUMMARY

Methods herein can be performed using a computerized device, and such methods may be maintained as instructions in a non-transitory storage medium that is readable by such a computerized device. The computerized device performs the method when the computerized device executes the instructions.

An exemplary method herein receives, into a computerized printing device, a print job. A processor of the printing device automatically determines whether the print job specifies one or more extended gamut color marking materials. The extended gamut color marking materials are marking materials having colorants other than standard colorants (the standard colorants being limited to the color space of cyan, magenta, yellow, black (CMYK)) colorants.

When the print job does not specify one or more of the extended gamut color marking materials, the processor of the printing device can automatically determine whether the print job will perform better with one or more of the extended gamut colorants in addition to the standard colorants. The decision can be based on previously established accuracy tolerance levels for the spot colors within the print job. The process of determining whether the print job will perform better with one or more of the extended gamut colorants in addition to the standard colorants can also be based on a previously prepared table comparing the color possible with the additional extended gamut colorants against the standard colorants, and/or based on whether the processor determines that a spot color within the print job is not one of the standard colorants.

This exemplary method prints the print job using the extended gamut colorants and the standard colorants (using a printing engine of the printing device) both when the print job specifies the extended gamut color marking material, and when the print job will perform better with one or more of the extended gamut colorants in addition to the standard colorants. Thus, when the print job does not specify the extended gamut color marking material, and when the print job will not perform better with one or more of the extended gamut colorants in addition to the standard colorants, the method simply prints the print job using only the standard colorants (using the printing engine of the printing device).

Also, the process of determining whether the print job can use the extended gamut color can be performed on a page-by-page basis of the print job. Similarly, the printing of the print job using the extended gamut colorants can be performed on a page-by-page basis.

An exemplary printing device embodiment herein comprises an input device that receives a print job, a processor operatively connected to the input device, and a printing engine operatively connected to the processor. The processor determines whether the print job specifies one or more of the extended gamut color marking materials.

When the print job does not specify one or more of the extended gamut color marking materials, the processor determines whether the print job will perform better with one or more of the extended gamut colorants in addition to the standard colorants. The printing device prints the print job using the extended gamut color and the standard colorants when the print job specifies the extended gamut color marking material, and also when the print job will perform better with one or more of the extended gamut colorants in addition to the standard colorants.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
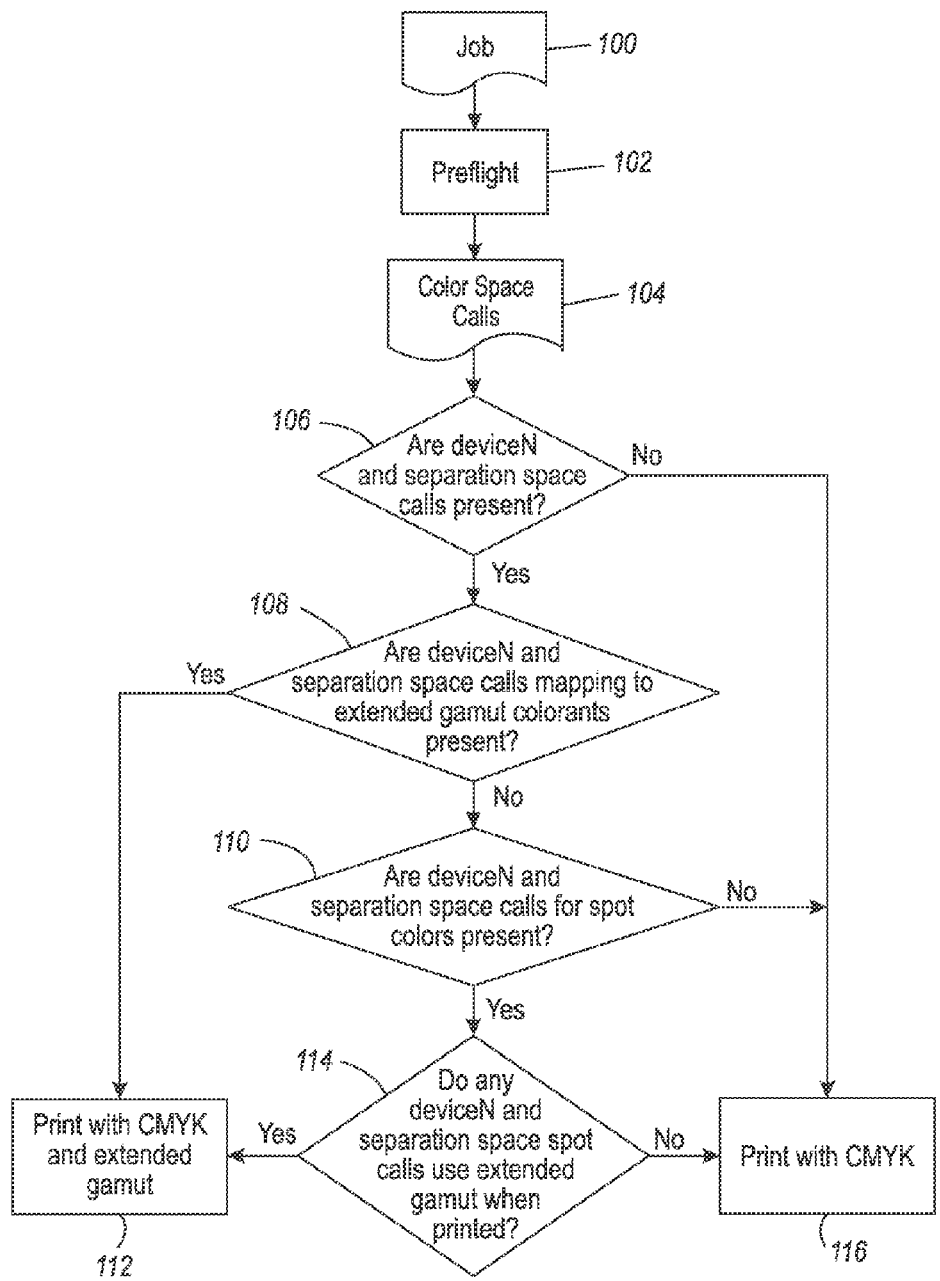
FIG. 1 is a flow diagram illustrating various embodiments herein.

As mentioned above, users conventionally manually identify when to use the more expensive extended gamut colorants, and if such are specified for a standard color space (CMYK) the more expensive extended gamut colorants may produce no increase in image quality (or may actually decrease image quality). For many jobs sent to an extended gamut printer, there will be little to no image quality benefit of printing with the "extra" colorants verses printing with just the base CMYK colorants.

Within a print job's printer definition language (PDL) file will be color space calls for "extra" colorants directly with no color management (e.g., a Separation Orange color space call). Additionally PDL files could include color calls for spot colorants, which require color management (e.g., a separation pantone rubine red U color space call). For extended color devices that can print with extended gamut colorants, the printer's processor (often referred to as a digital front end (DFE)) will understand the capabilities of the attached image output terminal (IOT) or printing engine. The extended colorant names (e.g., orange and violet) for the attached IOT will, therefore, be known by the processor.

For example, when printing with standard colorants, the standard 4 planes (one each for each of the CMYK colorants) are submitted to the printing engine for a print job having color calls for standard colorants, without calling for the more expensive extended gamut colorants. However, for print jobs using extended gamut colorants, 5 or more planes of data will be sent to the printing engine. Charges and toner consumption will be higher for extended gamut usage.

Thus, the printer's processor will use a job attribute for color mode to indicate to the raster image processor (RIP) the number of and type of colorant planes to be produced. The enumerations for the color modes could be, for example:
1. CMYK
2. CMYK+Orange
3. CMYK+Orange+Violet
4. CMYK+Violet
5. CMYK+Green While orange, violet and green are arbitrarily used as examples of extended gamut colorants herein, those ordinarily skilled in the art would understand that the extended gamut colorants are not limited to these examples, but could include any extended gamut colorants, whether currently known or developed in the future. Therefore, the methods and systems herein could use more than 6 colorants.

The processor of the printing device performs standard operations that are sometimes referred to as "preflight" operations, which generally involves reviewing print information for errors or possible printing problems before actually printing the information. With methods and systems herein, the job is pre-flighted by the processor to determine the separation and deviceN calls within. If no separation or device calls are present, standard CMYK printing mode is used.

The tests below are performed before the job is committed to raster image processing (RIPing). The tests determine which color mode will be used for raster image processing and hence the number of print planes to be generated. For example, if the tests determine CMYKOV (CMYK+Orange+Violet) is needed, 6 planes will be raster image processed, and a CMYKOV destination profile used for color conversions.

With systems and methods herein, if a separation space call corresponding to the device object extended gamut colorants loaded is already present in the printing device, the appropriate extended gamut mode is set on the color mode attribute, and the job is printed without further analysis. The jobs could be set to a HOLD state until the required best match colorants are loaded.

If one or more spot color calls are present, the spot color name is compared to a table (for the device object extended gamut configuration). The table has been previously established from empirical testing (for a given class of printing engines) to determine if use of the extended gamut colorants would be beneficial. The table entries for a spot color could also be built "on the fly" using either destination profiles or printer color models for the potential colorant sets. Such prepared table(s) are loaded in memory of the printing device and could be searched using a hash technique.

More specifically, during such empirical testing, the methods and systems herein determine that the use of an extended gamut colorant would be beneficial if the error ($\Delta E$) for the extended gamut colorants is less than $\Delta E$ of the standard gamut colorants. $\Delta E$ is defined as the error between the actual color to be printed vs. the color requested. The color requested is defined as the optimal device independent color representation of the spot color call. The $\Delta E$ values are determined by comparing the spot color lab value to the gamut of the desired destination print space. If $\Delta E$ is for the extended gamut colorants is less than $\Delta E$ of the standard gamut colorants, this indicates that the extended gamut would be beneficial (would produce a more accurate color than with the standard gamut colorants) and, therefore, the appropriate extended gamut mode is set on the color mode attribute. If $\Delta E$ is for the extended gamut colorants is more than $\Delta E$ of the standard gamut colorants (indicating that the extended gamut would not be beneficial) the process is repeated on other color calls until a positive results occurs, or until no more calls are left to be compared.

Thus, the spot color gamut table(s) can be built, for example, using the following columns/attributes: Spot color name—string; $\Delta E$ for CMYK—float; $\Delta E$ for CMYKOV—float; $\Delta E$ for CMYKO—float; $\Delta E$ for CMYKV; $\Delta E$ for CMYKG—float, etc. The values can be determined in offline testing and captured in a static table. Also, the values can be determined dynamically using the CMYK destination profile on the queue and default destination profiles for CMYKOV, CMYKV, CMYKO and CMYKG. Similarly, multiple tables can be created and stored in advance of printing for each print configuration. For example, the following columns/attributes can be used in the tables. In such example, the first table would have the following column headings: Spot color name—string; $\Delta E$ for CMYK—float; $\Delta E$ for CMYKOV—float. The second table would have the following column headings: Spot color name—string; $\Delta E$ for CMYK—float; $\Delta E$ for CMYKO—float. The following tables would have similar column headings. While some table column headings are presented above as examples to illustrated the features of the methods and systems herein, those ordinarily skilled in the art would understand that any form of table could be used herein, and that the systems and methods herein are not limited to these specific examples.

Further, the methods and systems herein can be performed at any point in the system, including print servers, submission clients, etc. Also, the testing of whether to use extended gamut colorants can be made on a page-by-page basis. Therefore, evaluations could be done on a page basis and mode switching is accomplished through page exception programming.

Additional embodiments herein allow the user to set tolerance levels for spot color benefits. For example, the extended gamut colorants can be set by the user to only be used if $\Delta E$ for using the more expensive extended gamut colorants is a certain value or percentage below the $\Delta E$ for using standard gamut colorants. If the spot color call will not significantly benefit (according to the user-defined tolerance level) CMYK will be used. The tolerance levels can also be captured in multiple comparison tables for spot color calls. Further, additional attributes for customer selectable spot color tolerance could be added such as hue error($\Delta H$); a specific error measurement standard ($\Delta E2000$); chroma error($\Delta C$); etc.

Further, with methods and systems herein, the spot color testing of whether to use extended gamut colorants can be performed dynamically. This dynamic testing can be used for non-recognized spot color calls with an alternative color space of CIELAB. The CIELAB value is compared to the gamuts possible with the standard colorants and the extended colorant sets. If this color call requires an extended gamut color, printing can proceed with the extended gamut color. The tests are performed against all possible extended color gamut colorants, and the tests can be performed with weighting factors against the possible extended gamut configurations to determine the best extended gamut colorant fit.

FIG. 1 is flowchart illustrating an exemplary method herein. In item 100, this method receives, into a computerized printing device, a print job. In item 102, the method performs the preflight operations. Further, in item 104, the processor determines the different colorants that will be required for various parts of the print job (sometimes referred to herein as the "color space calls").

In item 106, the processor determines whether any of the color space calls in item 104 are deviceN and/or separation space color calls. If not, processing proceeds to item 116 to simply print with standard cyan, magenta, yellow, and black (CMYK) printing materials; however, if so, processing proceeds to item 108, where the processor determines whether the deviceN and/or separation space color calls map to extended gamut colorants. As mentioned above, the extended gamut color marking materials are marking materials having colorants other than standard colorants (the standard colorants being limited to the color space of (group of colorants) cyan, magenta, yellow, and black (CMYK)). Therefore in item 108, the processor of the printing device then automatically determines whether the print job specifies one or more extended gamut color marking materials.

If the deviceN and/or separation space calls map to extended gamut colorants processing proceeds to item 112, where printing is performed with CMYK and the indicated extended gamut colorants; however, if not, processing proceeds to item 110, where the processor determines whether any of the color calls are for spot colors. If not, processing proceeds to item 116 to simply print with standard CMYK printing materials; however, if so, in item 114, the processor determines whether the print job will perform better with one or more of the extended gamut colorants in addition to the standard colorants for such spot calls.

The determination in item 114 can be based on previously established, user-selected accuracy tolerance. The process of determining whether the print job will perform better with one or more of the extended gamut colorants in addition to the standard colorants in item 114 can also be based on a previously prepared table comparing the extended gamut colorants with the standard colorants, and/or based on whether the processor fails to recognize a spot color within the print job as being one of the standard colorants or the processor determines that a spot color is not one of the standard colorants.

Thus, this exemplary method prints the print job using the extended gamut colorants and the standard colorants (using a printing engine of the printing device) in item 112 both when the print job specifies the extended gamut color marking material in item 108, and when the print job will perform better with one or more of the extended gamut colorants in addition to the standard colorants in item 114. Further, when the print job does not specify the extended gamut color marking material in item 108, and when the print job will not perform better with one or more of the extended gamut colorants in addition to the standard colorants in item 114, the method simply prints the print job using only the standard colorants (using the printing engine of the printing device) in item 116.

As also mentioned above, the process of determining whether the print job can use the extended gamut color can be performed on a page-by-page basis of the print job. Similarly, the printing of the print job using the extended gamut colorants can be performed on a page-by-page basis.

Figure 2:
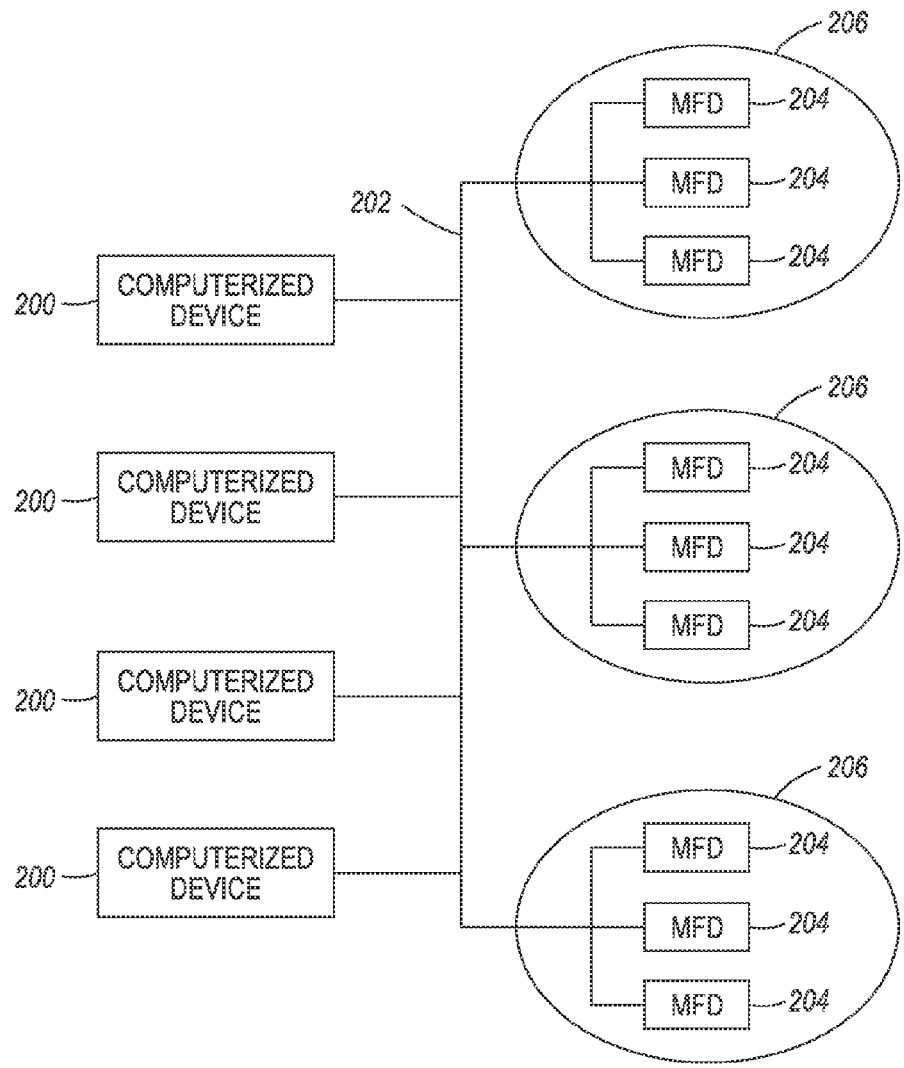
FIG. 2 is a schematic diagram of a system according to embodiments herein.

As shown in FIG. 2, exemplary system embodiments herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 3:
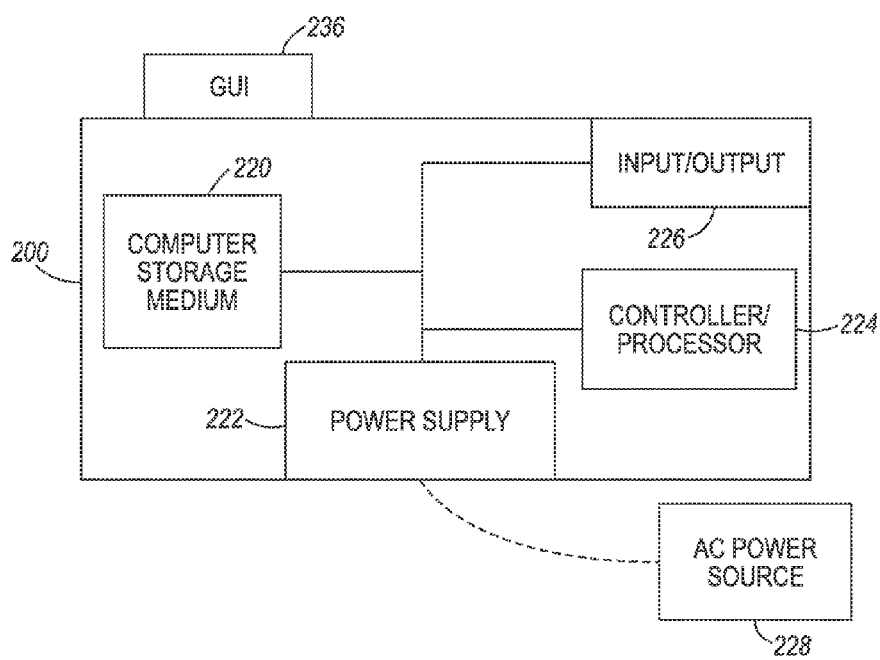
FIG. 3 is a side-view schematic diagram of a device according to embodiments herein.

FIG. 3 illustrates a computerized device 200, which can be used with embodiments herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 3, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 4:
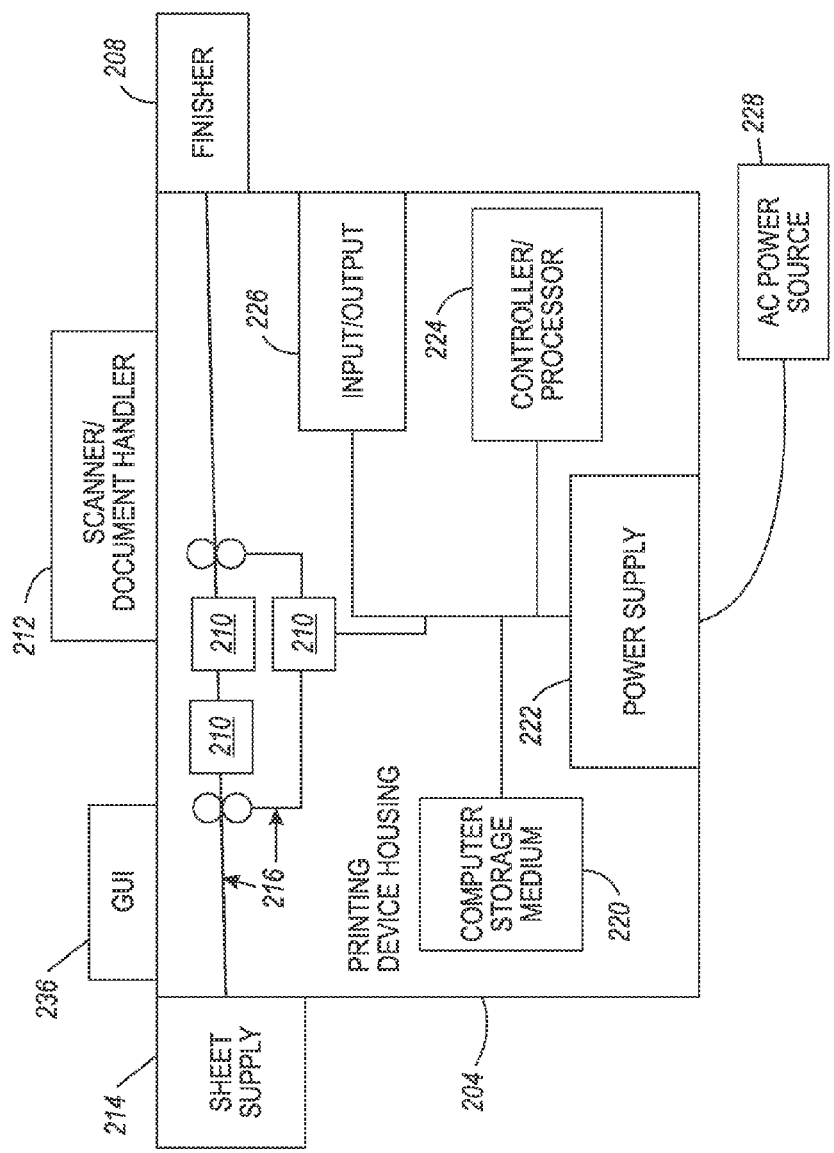
FIG. 4 is a side-view schematic diagram of a device according to embodiments herein.

FIG. 4 illustrates a computerized device that is a printing device 204, which can be used with embodiments herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

As would be understood by those ordinarily skilled in the art, the printing device 204 shown in FIG. 4 is only one example and the embodiments herein are equally applicable to other types of printing devices that may include fewer components or more components. For example, while a limited number of printing engines and paper paths are illustrated in FIG. 4, those ordinarily skilled in the art would understand that many more paper paths and additional printing engines could be included within any printing device used with embodiments herein.

In such a computerized (printing) device 204, the processor 224 determines whether the print job specifies one or more of the extended gamut color marking materials. When the print job does not specify one or more of the extended gamut color marking materials, the processor determines whether the print job will perform better with one or more of the extended gamut colorants in addition to the standard colorants. The printing device prints the print job using the extended gamut color and the standard colorants when the print job specifies the extended gamut color marking material, and also when the print job will perform better with one or more of the extended gamut colorants in addition to the standard colorants.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A method comprising:
   receiving, into a printing device, a print job;
   determining, by a processor of said printing device, whether said print job specifies one or more extended gamut color marking materials, said extended gamut color marking materials comprising marking materials having colorants other than standard colorants, said standard colorants consisting of cyan, magenta, yellow, black (CMYK);
   when said print job does not specify one or more of said extended gamut color marking materials, determining, by said processor of said printing device, whether said print job will perform better with one or more of said extended gamut colorants in addition to said standard colorants; and
   printing said print job using said extended gamut color and said standard colorants, using a printing engine of said printing device, when said print job specifies said extended gamut color marking material, and when said print job will perform better with one or more of said extended gamut colorants in addition to said standard colorants.

2. The method according to claim 1, said determining of whether said print job will perform better with one or more of said extended gamut colorants in addition to said standard colorants being performed on a page-by-page basis of said print job; and printing said print job using said extended gamut color being performed on a page-by-page basis.

3. The method according to claim 1, said determining of whether said print job will perform better with one or more of said extended gamut colorants in addition to said standard colorants being based on whether said processor determines a spot color within said print job as not being one of said standard colorants.

4. The method according to claim 1, said determining of whether said print job will perform better with one or more of said extended gamut colorants in addition to said standard colorants being based on a previously prepared table comparing said extended and standard gamut colorants with said standard colorants.

5. The method according to claim 1, further comprising printing said print job using only said standard colorants, using said printing engine of said printing device, when said print job does not specify said extended gamut color marking material, and when said print job will not perform better with one or more of said extended gamut colorants in addition to said standard colorants.

6. A method comprising:
   receiving, into a printing device, a print job;
   determining, by a processor of said printing device, whether said print job specifies one or more extended gamut color marking materials, said extended gamut color marking materials comprising marking materials having colorants other than standard colorants, said standard colorants consisting of cyan, magenta, yellow, black (CMYK);
   when said print job does not specify one or more of said extended gamut color marking materials, determining, by said processor of said printing device, whether said print job will perform better with one or more of said extended gamut colorants in addition to said standard colorants based on previously established accuracy tolerance levels; and
   printing said print job using said extended gamut colorant and said standard colorants, using a printing engine of said printing device, when said print job specifies said extended gamut color marking material, and when said print job will perform better with one or more of said extended gamut colorants in addition to said standard colorants.

7. The method according to claim 6, said determining of whether said print job will perform better with one or more of said extended gamut colorants in addition to said standard colorants being performed on a page-by-page basis of said print job; and printing said print job using said extended gamut color being performed on a page-by-page basis.

8. The method according to claim 6, said determining of whether said print job will perform better with one or more of said extended gamut colorants in addition to said standard colorants being based on whether said processor determines a spot color within said print job as not being one of said standard colorants.

9. The method according to claim 6, said determining of whether said print job will perform better with one or more of said extended gamut colorants in addition to said standard colorants being based on a previously prepared table comparing said extended gamut colorants with said standard colorants.

10. The method according to claim 6, further comprising printing said print job using only said standard colorants, using said printing engine of said printing device, when said print job does not specify said extended gamut color marking material, and when said print job will not perform better with one or more of said extended gamut colorants in addition to the standard colorants.

11. A printing device comprising:
an input device receiving a print job;
a processor operatively connected to said input device; and
a printing engine operatively connected to said processor, said processor determining whether said print job specifies one or more extended gamut color marking materials,
said extended gamut color marking materials comprising marking materials having colorants other than standard colorants,
said standard colorants consisting of cyan, magenta, yellow, black (CMYK),
when said print job does not specify one or more of said extended gamut color marking materials, said processor determining whether said print job will perform better with one or more of said extended gamut colorants in addition to said standard colorants, and
said printing device printing said print job using said extended gamut color and said standard colorants when said print job specifies said extended gamut color marking material, and when said print job will perform better with one or more of said extended gamut colorants in addition to said standard colorants.

12. The printing device according to claim 11, said determining of whether said print job will perform better with one or more of said extended gamut colorants in addition to said standard colorants being performed on a page-by-page basis of said print job; and printing said print job using said extended gamut color being performed on a page-by-page basis.

13. The printing device according to claim 11, said determining of whether said print job will perform better with one or more of said extended gamut colorants in addition to said standard colorants being based on whether said processor determines a spot color within said print job as not being one of said standard colorants.

14. The printing device according to claim 11, said determining of whether said print job will perform better with one or more of said extended gamut colorants in addition to said standard colorants being based on a previously prepared table comparing said extended gamut and standard colorants with said standard colorants.

15. The printing device according to claim 11, said printing engine printing said print job using only said standard colorants when both said print job does not specify said extended gamut color marking material and said print job will not perform better with one or more of said extended gamut colorants in addition to said standard colorants.

16. A non-transitory computer storage medium readable by a computerized printing device, said non-transitory computer storage medium storing instructions executable by said computerized printing device to perform a method comprising:
receiving a print job;
determining whether said print job specifies one or more extended gamut color marking materials, said extended gamut color marking materials comprising marking materials having colorants other than standard colorants, said standard colorants consisting of cyan, magenta, yellow, black (CMYK);
when said print job does not specify one or more of said extended gamut color marking materials, determining whether said print job will perform better with one or more of said extended gamut colorants in addition to said standard colorants; and
printing said print job using said extended gamut color and said standard colorants when said print job specifies said extended gamut color marking material, and when said print job will perform better with one or more of said extended gamut colorants in addition to standard colorants.

17. The non-transitory computer storage medium according to claim 16, said determining of whether said print job will perform better with one or more of said extended gamut colorants in addition to said standard colorants being performed on a page-by-page basis of said print job; and printing said print job using said extended gamut color being performed on a page-by-page basis.

18. The non-transitory computer storage medium according to claim 16, said determining of whether said print job will perform better with one or more of said extended gamut colorants in addition to standard colorants being based on whether said processor determines a spot color within said print job as not being one of said standard colorants.

19. The non-transitory computer storage medium according to claim 16, said determining of whether said print job will perform better with one or more of said extended gamut colorants in addition to standard colorants being based on a previously prepared table comparing said extended gamut colorants with said standard colorants.

20. The non-transitory computer storage medium according to claim 16, said method further comprising printing said print job using only said standard colorants, using said printing engine of said printing device, when said print job does not specify said extended gamut color marking material, and when said print job will not perform better with one or more of said extended gamut colorants in addition to said standard colorants.

* * * * *